United States Patent
Best et al.

[15] 3,658,183
[45] Apr. 25, 1972

[54] FILTER HOLDER

[72] Inventors: Roger J. Best, Castro Valley; Richard G. Sears, Livermore, both of Calif.

[73] Assignee: General Electric Company

[22] Filed: Mar. 19, 1970

[21] Appl. No.: 21,142

[52] U.S. Cl............................................210/446, 210/451
[51] Int. Cl........................................................B01d 35/00
[58] Field of Search..........................210/445, 446, 451, 453

[56] References Cited

UNITED STATES PATENTS

| 2,665,009 | 1/1954 | Harstick | 210/445 X |
| 2,818,178 | 12/1957 | Hodsdon | 210/446 X |
| 2,879,207 | 3/1959 | Poitras | 210/446 X |
| 3,386,585 | 6/1968 | Weyand et al. | 210/446 X |

FOREIGN PATENTS OR APPLICATIONS

| 241,928 | 12/1962 | Australia | 210/446 X |

*Primary Examiner*—Rueben Friedman
*Assistant Examiner*—R. W. Burks
*Attorney*—Ivor J. James, Jr., Samuel E. Turner, Sam E. Laub, Frank L. Neuhauser, Oscar B. Waddell and Joseph B. Forman

[57] ABSTRACT

A holder for thin filter elements formed of two components adapted to snap together to capture the filter element therebetween without damage to or distortion of the filter element.

5 Claims, 6 Drawing Figures

Patented April 25, 1972

INVENTORS:
ROGER J. BEST
RICHARD G. SEARS

BY: Samuel E. Turner
ATTORNEY

Patented April 25, 1972  3,658,183

FILTER HOLDER

BACKGROUND

There is a need for a holding device for thin membrane filters useful for filtration in cytology, serum prefiltration, ultracleaning of water, bacteria culturing, microbiology, general microscopic analysis and the like.

Such a device should be compact, liquid tight and inexpensive. The device should provide ready insertion and removal of the filter element without distortion or risk of damage to the filter element. The device also should provide adequate support for the filter element without undue restriction of flow therethrough.

Prior filter holding devices have been found inadequate for thin membrane filters for reasons including the following: inadequate filter support, lack of filter positioning means, threaded components requiring twisting against the filter element with consequent danger of filter distortion or damage.

SUMMARY

An object of this invention is to provide a filter holder which positions and supports the filter element, which can be assembled and disassembled in a simple familiar manner and which maintains a tight seal without distortion or damage to the filter element.

This and other objects are achieved by a two-component filter holder including a support member and a cap member adapted to snap together to capture a filter element between opposing surfaces of the support and cap members, one of these surfaces being recessed to provide positive location of the filter element. For larger sized filter elements the holder is provided with a series of ribs for intermediate support of the filter element.

In an alternate embodiment the filter holder is square or rectangular in shape to thus accommodate similarly shaped filter elements. This configuration is less wasteful of filter element material since such filter elements are ordinarily cut from strip stock.

DRAWING

The invention is described in greater detail hereinafter with reference to the accompanying drawing, wherein.

DESCRIPTION

Figure 1:
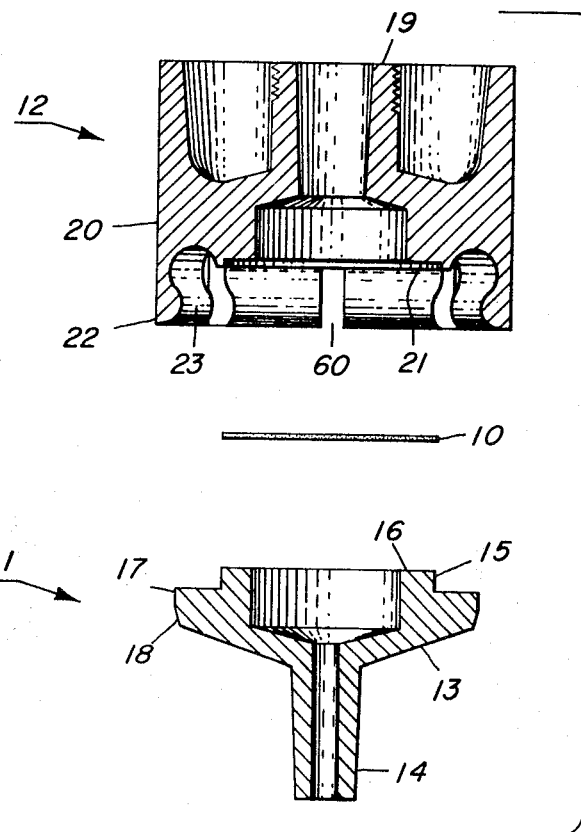
FIG. 1 is an exploded elevation view, in section, of a first embodiment of the filter holder for relatively small filter elements.
Figure 2:
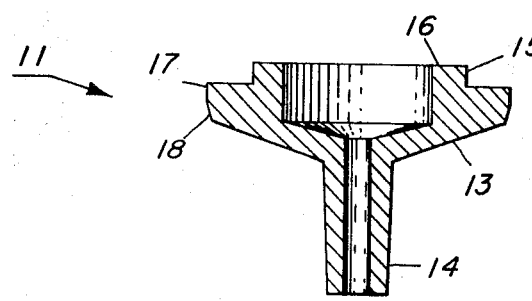
FIG. 2 is an elevation view, partly in section, of the assembled filter holder of FIG. 1.
Figure 2:
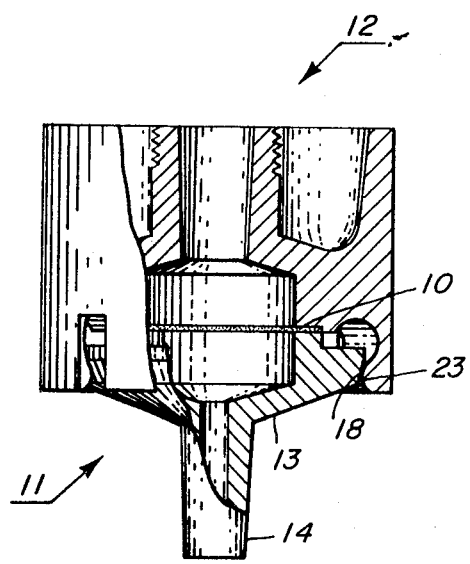

A first embodiment of a filter holder, illustrated in FIGS. 1 and 2, is suitable for accommodating a relatively small thin filter element 10 in the order of 13 mm in diameter. The filter holder is formed of two components — a funnel-shaped base member 11 and a centrally apertured cap member 12.

The base member 11 includes a centrally apertured filter member support section 13, a hollow stem 14 depending therefrom, a raised annular portion 15 which provides a filter member contact and support area 16 and a peripheral shoulder 17 formed with a taper 18.

The cap member 12 includes an apertured inlet 19, a hollow body portion 20, a recessed area 21 for locating and contacting the filter element 10, and a resilient re-entrant lip 22 formed with an inner rounded portion 23.

The filter holder is best assembled by inverting the cap member 12, placing the filter element 10 on the recessed area 21, and snapping the tapered shoulder 17 of the base member 11 into the resilient lip 22. In the assembled position the inner rounded portion 23 of the resilient lip 22 engages the tapered portion 18 of the shoulder 17. Thus a component of the force of the resilient engagement urges the base member 11 and the cap member 12 together thereby clamping the peripheral portion of the filter element 10 between the surface 16 and the opposing recessed surface 21. Advantageously, the area of the surface 16 may be greater than the area of the recessed surface 21 whereby upon disassembly of the filter holder the filter element 10 preferentially tends to adhere to the surface 16 thus facilitating its removal.

The inlet 19 of the cap member 12 may be formed with a smooth cylindrical outer surface, or with a taper, or with threads (as illustrated) or with any other suitable means for attachment to a fluid input line.

Figure 3:
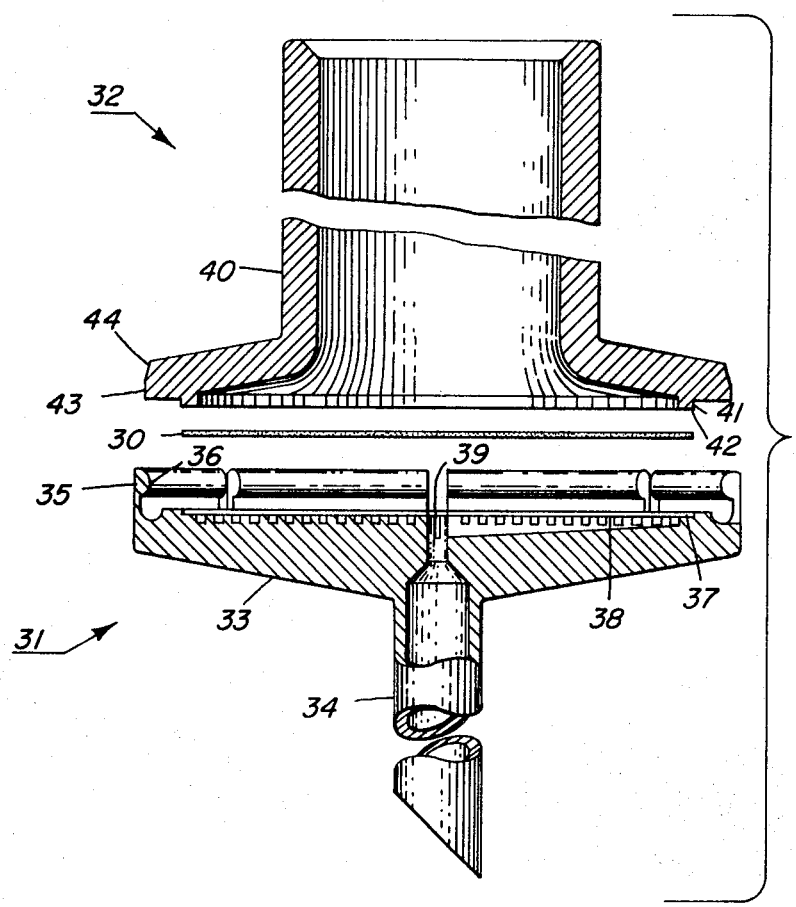
FIG. 3 is an exploded elevation view, in section, of a second embodiment of the filter holder for relatively large circular filter elements.
Figure 4:
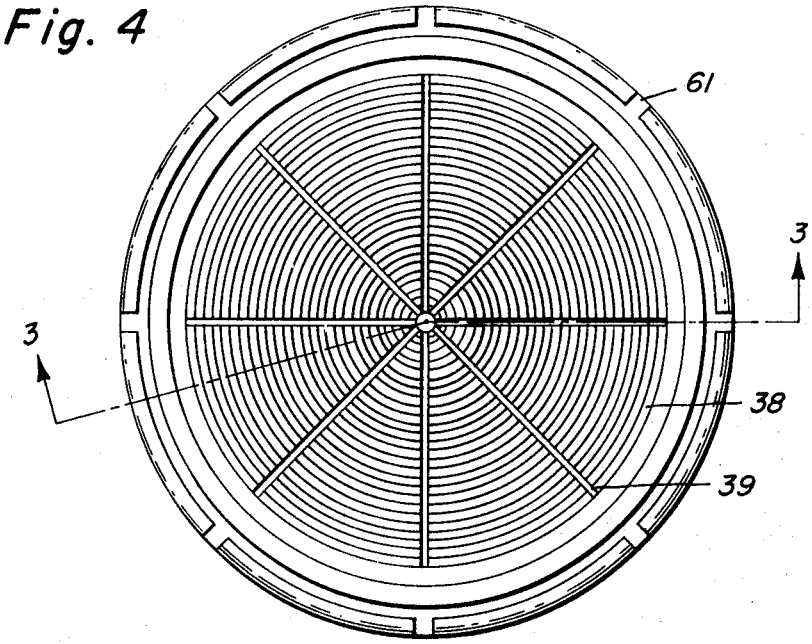
FIG. 4 is a plan view of the support member of the filter holder of FIG. 3.

A second embodiment of a filter holder, illustrated in FIGS. 3 and 4, is suitable for accommodating a larger thin circular filter element 30, for example in the order of 25 mm or larger. As illustrated the filter holder of this embodiment includes a funnel-shaped base member 31 and a cylindrical, volumetric cap member 32. (The cap member 32, however, may be formed with an inlet to receive a fluid input line.)

The base member 31 comprises a centrally apertured filter member support section 33, a hollow stem 34 depending therefrom and a resilient, re-entrant lip 35 formed with an inner rounded portion 36. The filter member support section 33 includes an annular, recessed area 37 for receiving and locating the filter element 30 and a series of radially spaced, raised annular ribs or rings 38 for providing intermediate support of the relatively large filter element 30. The rings 38 are divided into arcuate sections by radially extending fluid flow channels 39 leasing to the central opening of the hollow stem 34.

The cap member 32 includes a cylindrical body portion 40, a raised annular portion 41 which provides a filter member contact area 42, and a peripheral shoulder 43 formed with a taper 44.

Assembly of the embodiment of FIGS. 3 and 4 is similar to assembly of the embodiment of FIGS. 1 and 2. The filter element 30 is placed on the recessed area 37 and the shoulder 43 of cap member 32 is snapped into the lip 35 of the support member 31, the rounded inner edge 36 of lip 35 engaging the tapered portion 44 of the shoulder 43 wherein the peripheral portion of the filter element is captured between the surface 42 and the recessed surface 37.

Figure 5:
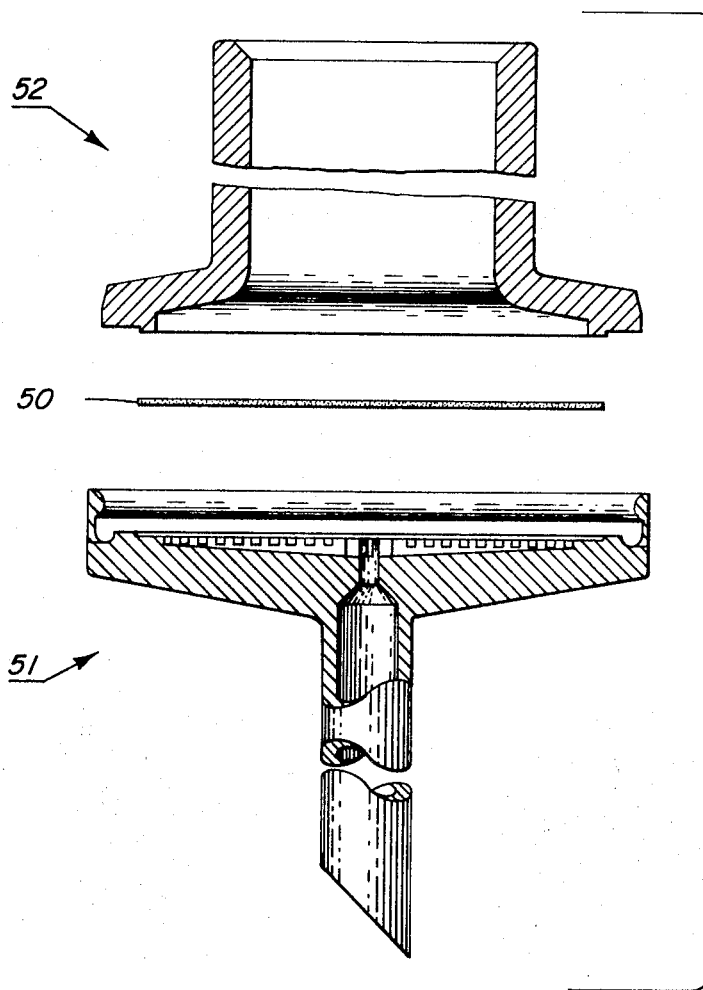
FIG. 5 is an exploded elevation view, in section, of a third embodiment of the filter holder for relatively large non-circular filter elements.
Figure 6:
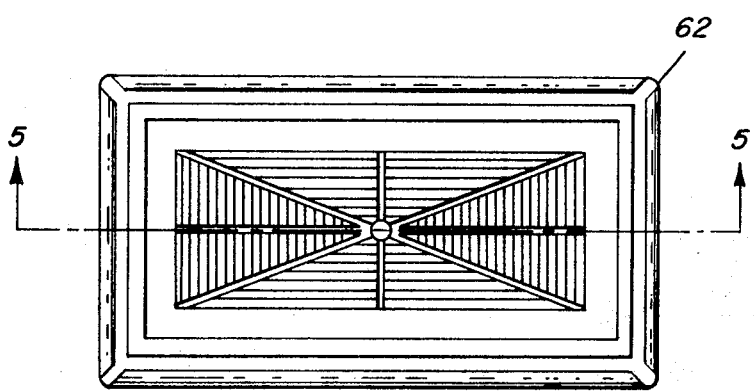
FIG. 6 is a plan view of the support member of the filter holder of FIG. 5.

Illustrated in FIGS. 5 and 6 is a third embodiment of a filter holder, comprising a base member 51 and a volumetric cap member 52, adapted to accommodate a relatively large thin filter element 50 which is rectangular (or which may be square) in shape. The structure and operation of this embodiment is otherwise similar to the embodiment of FIGS. 3 and 4.

The filter holders described herein may be formed of a suitable moldable plastic. Suitable "soft" plastics include nylon and tetrafluoroethylene. Suitable "hard" plastics include polypropylene and polycarbonate. When a relatively hard plastic is used it may be desirable to split the resilient lip with a plurality of slots (such as slots 60, 61 and 62 in FIGS. 1, 4 and 6, respectively) to render the lip sufficiently flexible to snap over the cooperating tapered shoulder.

Microporous thin plastic membrane filters suitable for use in the filter holder may be produced by methods described by Robert B. Johnston et al., in copending patent application Ser. No. 571,819, filed Aug. 11 1966.

Thus what has been described is a simple, inexpensive filter holder, which provides location of the filter element, which assembles and disassembles a simple familiar manner and which attains tightness of seal without danger of distortion or damage to the filter element.

What is claimed is:

1. A holder for removably supporting a filter element comprising: a first component comprising a funnel-shaped base including a centrally apertured filter member support section, a hollow stem depending from said support section, a surface formed on said support section opposite said stem adapted to contact and support one side of a peripheral portion of said filter element; a second component comprising a centrally apertured cap including a surface adapted to contact the other side of said peripheral portion of said filter element; and means for removably securing said first and second components together including a tapered peripheral shoulder formed on one of said components, and a rounded resilient re-entrant lip formed about the periphery of the other one of said components and having a plurality of narrow slots radially spaced about said lip enabling said lip to resiliently engage the tapered portion of said shoulder on said one of said components, said taper being in a direction to provide a component of the force of the resilient engagement in a direction urging said first and second components together for clamping said peripheral portion of said filter member therebetween.

2. The holder of claim 1 wherein the area of said surface of said first component contacting said filter element is greater than the area of said surface of said second component contacting said filter element.

3. The holder of claim 1 wherein the surface of one of said components contacting said filter element is recessed to laterally locate said filter element.

4. The holder of claim 1 wherein said resilient lip is formed with a plurality of transverse slots to facilitate engagement with said shoulder.

5. The holder of claim 1 wherein said support section of said first component is formed with a series of spaced ribs for providing intermediate support of said filter element.

* * * * *